No. 12,379. REISSUED AUG. 15, 1905.
C. CONTAL.
RATCHET SCREW KEY.
APPLICATION FILED APR. 15, 1905.
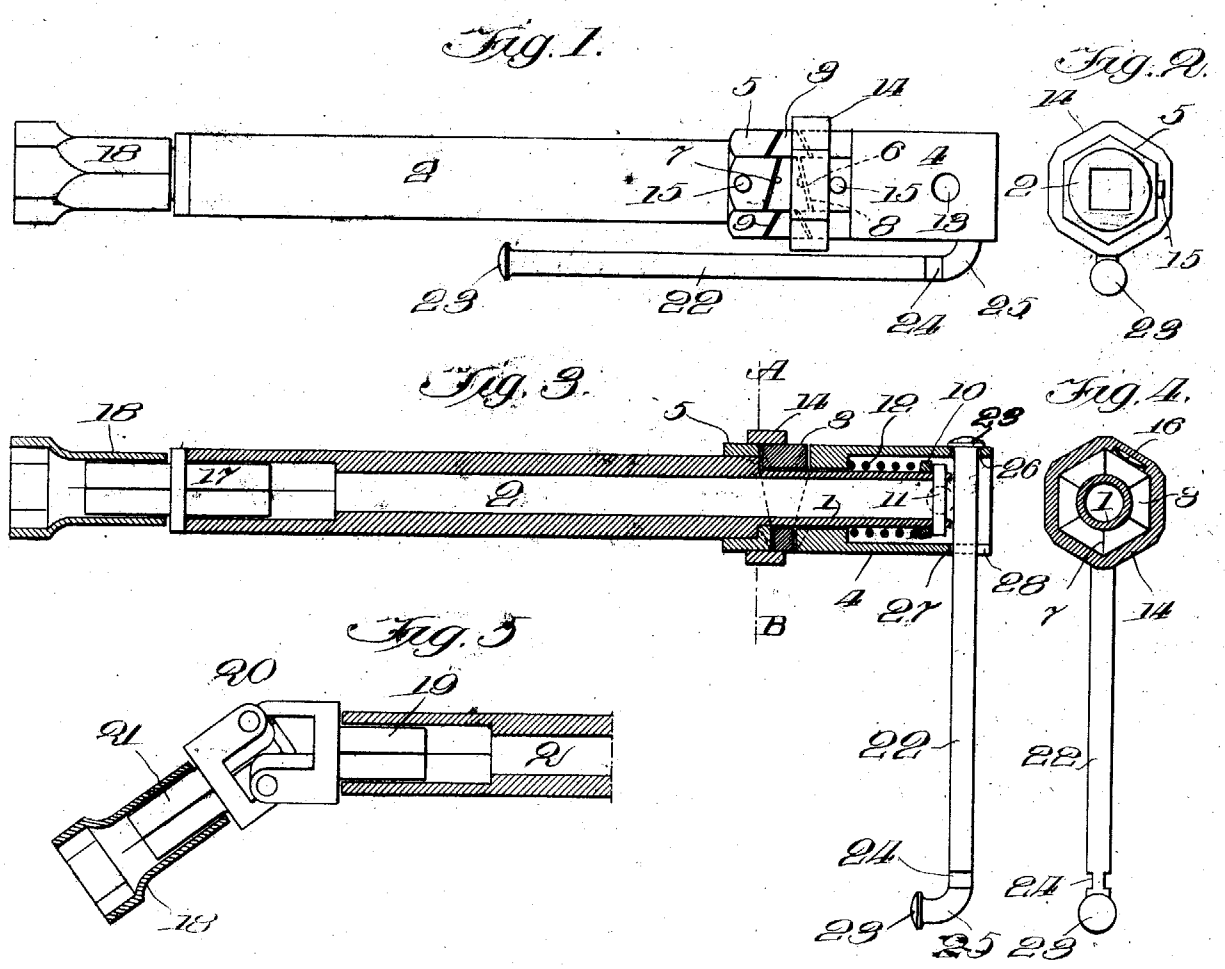
Witnesses:
H. S. Grattan
C. A. Mullen
Inventor:
Camille Contal
by Hamilton & Wilkinson
Attorneys.

UNITED STATES PATENT OFFICE.

CAMILLE CONTAL, OF PARIS, FRANCE.

RATCHET SCREW-KEY.

No. 12,379. Specification of Reissued Letters Patent Reissued Aug. 15, 1905.

Original No. 751,055, dated February 2, 1904. Application for reissue filed April 15, 1905. Serial No. 255,844.

*To all whom it may concern:*

Be it known that I, CAMILLE CONTAL, engineer, a citizen of the Republic of France, residing at 186 Boulevard Pereire, Paris, in the Republic of France, have invented certain new and useful Improvements in Ratchet Screw-Keys, of which the following is a specification.

This invention relates to a ratchet screw-key for screwing and unscrewing nuts or for turning divers objects in either direction; and it has for its object to so construct a key of this character that it will be simple, strong, and easy to lubricate or clean as to the parts subjected to friction. The said key comprises a stem arranged in the form of a tool or adapted to receive a tool and provided with an extension around which are loosely mounted a ratchet-disk and a head arranged in the form of a handle or adapted to receive a handle. On the said key is also mounted a spiral spring which presses the said head against the ratchet-disk and both the head and the disk against the end of the stem, the contact-faces of the said head and of the said stem being provided with teeth inclined in opposite directions, meshing with the corresponding teeth of the ratchet-disk in the same manner as pawls. The end of the stem, the ratchet-disk, and the head are also provided with means to rigidly connect the ratchet-disk either with the head or with the stem or with both at the same time. In the first case by the oscillating movement of the head moving and coacting with the ratchet-disk the pawl of the stem is operated in one direction—to screw, for instance. In the second case the oscillating movement of the head with its pawl causes the ratchet-disk moving and coacting with the stem to turn in the opposite direction—to unscrew, for instance. In the third case the head moves and coacts with the stem in both directions.

The accompanying drawings show, by way of example, one form of carrying out the present invention.

Figure 1 is an elevation of the key, the operating-handle being brought inward alongside the key. Fig. 2 is an end view of the key, the tool being withdrawn from the stem or from the bore in the same. Fig. 3 is a longitudinal section of the key, the handle being in its operative position. Fig. 4 is a transversal section on the line A B of Fig. 3. Fig. 5 is a part elevation showing the universal joint used.

On an extension of reduced diameter 1 at the end of a hollow stem 2 a ratchet-disk 3 and a tubular and handled head 4, both of which are free to turn and slide, are loosely mounted, a toothed crown or pawl 5 being also fixedly mounted on the said extension. The lateral faces of the ratchet-disk 3 are provided with teeth 6 and 7, which mesh, respectively, with the teeth 8 and 9, formed on the head 4 and on the crown 5, the said teeth being inclined in opposite directions, as shown in Fig. 1. Between the bottom of the head 4 and a washer 10, held on the extension 1 by a pin 11, is located a spiral spring 12, which tends to press the head 4 against the ratchet-disk 3 and the said disk against the crown 5. Two holes 13 are provided in the head 4 to allow of putting the pin 11 in place.

The periphery of the ratchet-disk 3 and of the two pawls 5 and 8 is angular and is surrounded by a slidable ring 14 of corresponding shape. The width of the said ring is such that it is capable of covering at the same time both the edges of the disk and those of the two pawls. The said ring can be moved so as to connect the disk 3 only with the head 4 (see Fig. 1) or only with the crown 5. (See Fig. 3.) Studs 15 limit the movement of the ring 14 in both directions. In order to hold the said ring in each position in which it is put by hand, a flat spring 16 is housed in a mortise of the ring and bears against the periphery of the disk 3, thus exercising sufficient friction to keep the ring in place.

In the square orifice of the bore 2 there may be located a square rod 17, onto which divers tools may be adapted. The drawings show a tool capable of fitting onto nuts and consisting of a tube 18, one end of which is made square to take onto the rod 17 and the other end of which is opened out in the form of a polygonal cap corresponding in shape to that of the nut onto which the cap or key is to take.

Instead of only a square rod 17 there may be inserted in the bore 2 a square rod 19, (see Fig. 5,) connected by a universal joint 20 to another square rod 21, onto which there may be placed tools, such as that 18.

Within the head 4 of the screw-key an operating lever or handle 22 is mounted in a very simple manner, which allows of bringing it alongside the screw-key. The said handle consists of a cylindrical rod having at each end a head 23 and provided with a flat part 24 near the end portion 25, which is curved at right angles. The handle 22 is free to slide through two openings 26 and 27 in the head 4, the latter opening 27 being extended by a slit 28, through which the flat part 24 can be passed. When the handle is located in the two openings 26 and 27, as shown in Fig. 3, it cannot pass out through the slit 28, while being easy to operate to give either a reciprocating or continuous rotary movement to the head 4. To bring the handle alongside the screw-key, as shown in Fig. 1, it is slid in the openings 26 and 27 until the flat part 24 can be passed out through the slit 28, after which the curved part 25 is brought into the opening 26 and the handle is turned parallel to the stem 2. The screw-key is thus rendered compact.

Instead of a square rod 17 there may be used tools, such as 18, having a square end which takes directly into the orifice of the bore, or any other suitable fixing means may be used.

I claim—

1. An instrument of the class described comprising a stem and a head, the two engaged together but revoluble independent of each other, reversible clutch mechanism interposed between the two, and means for engaging said clutch mechanism either with the head or with the stem whereby a revolution of the head may be made to turn the stem in either direction desired.

2. A ratchet-key for screwing, unscrewing, and the like, comprising a stem and a head engaged together, the two being revoluble independent of each other, a disk located between the stem and the head and provided with means constituting a clutch for engaging both the stem and the head, and movable means for fixedly engaging the disk with either the stem or head as may be desired whereby when the disk is fixedly engaged to one part, it has a clutch engagement with the other.

3. A ratchet-key for screwing, unscrewing, and the like, comprising a stem, a ratchet-disk revolubly mounted on said stem, a head, pawls on the disk coacting respectively with the stem and the head, and means for fixedly connecting the disk either with the head or with the stem, or with both at the same time.

4. An instrument of the class described comprising a stem and a head the two engaged together but revoluble independent of each other, reversible clutch mechanism interposed between the two, means for engaging said clutch mechanism either with the head or with the stem whereby a revolution of the head may be made to turn the stem in either direction desired, and a universal joint the latter provided at one end with an angular-shaped fitting to detachably engage the end of the stem and provided on the other end with means for engaging a tool thereto.

5. A ratchet-key for screwing, unscrewing, and the like, comprising a stem having an extension, a ratchet-disk loosely mounted on the said extension, pawls coacting respectively with the stem and with the head and engaged by the said ratchet-disk a spiral spring mounted on the said extension to hold the ratchet-disk and the pawls in mesh, and means for rigidly connecting the ratchet-disk either with one of the pawls, or with the other pawl, or with both at the same time.

6. A ratchet-key comprising a stem having an extension, a ratchet-disk and a head loosely mounted on the said extension, pawls formed on the inner faces of the stem, and of the head, a spring holding the ratchet-disk and the pawls in mesh, and a movable ring for causing the ratchet-disk to coact with either one or the other pawl or with both at the same time, the said ring having, the same as both the ratchet-disk and the pawls, angular guide-faces.

7. A ratchet-key comprising a stem, a ratchet-disk, a hollow head, pawls formed on the stem and on the head, a spring to hold the ratchet-disk and the pawls in mesh, means for connecting the ratchet-disk with either pawl, in combination with an operating-rod bent at one end, a head at each end of the said rod, a reduced part on the rod, two openings in the wall of the head and in which rod is slidable, and a slit connecting one of the said openings with the edge of the head and through which the reduced part can be passed, in order to allow of the operating-rod being brought alongside of the screw-key.

8. A screw-key comprising a stem, a ratchet-disk, a head, pawls formed on the stem and on the head, a spring to hold the ratchet-disk and the pawls in mesh, means for connecting the ratchet-disk with either of the pawls, in combination with a fork arranged to fit on the end of the stem, another fork arranged to receive a tool, and a spider connecting the two forks in the same manner as a universal joint.

In testimony that I claim the foregoing as my invention I have signed my name in presence of two subscribing witnesses.

CAMILLE CONTAL.

Witnesses:
ARCHIBALD R. BAKER,
JOHN BAKER.